UNITED STATES PATENT OFFICE.

ALEXANDER BIRKHOLZ, OF HARTFORD, CONNECTICUT.

IMPROVED COMPOSITION METAL OF IRON, ZINC, AND COPPER.

Specification forming part of Letters Patent No. 34,621, dated March 11, 1862.

*To all whom it may concern:*

Be it known that I, ALEXANDER BIRKHOLZ, of the city and county of Hartford, and State of Connecticut, have invented or discovered certain new and useful improvements in the composition of cast metal, by means of which greater strength is acquired; and I do hereby declare that the same is described in the following specification so as to enable a person skilled to make the same. I will therefore proceed to describe its component parts, the essential ingredient of which is cast-iron.

To make one hundred pounds of this composition, I first take two pounds of cast-iron, two ounces of charcoal, put into a crucible, and heat to a white heat. I then add thereto sixty pounds of copper, heat till both are melted together, then add four ounces of borax and thirty-eight pounds of zinc.

The mode of proceeding during the melting is much the same as with all other metals melted in crucibles. When melted it may be poured into molds or bars suitable for the forge or rolling-mill. Its strength is estimated to be eight thousand pounds greater to the square inch than the best wrought-iron, rendering it far more valuable for various purposes.

The proportions of parts may be varied, which will only change proportionably the desired effect—viz., greater amount of strength and solidity; but I believe that the proportions about as described will be best for all practicable purposes.

I have described its component parts and the mode of proceeding to produce my improved composition, so as to enable a person skilled to make the same.

What I claim, therefore, and desire to secure by Letters Patent, is—

The introduction of cast-iron into a composition composed of copper and zinc, in about the proportion, substantially in the manner as described.

In testimony whereof I have hereunto set my hand and seal this 10th day of February, 1862.

ALEXANDER BIRKHOLZ. [L. S.]

Witnesses:
GEO. STARKWEATHER,
JEREMY W. BLISS.